(12) United States Patent
Piva et al.

(10) Patent No.: US 7,441,393 B2
(45) Date of Patent: Oct. 28, 2008

(54) HARVESTING MACHINE FOR TUFT VEGETABLES

(76) Inventors: Tiziano Piva, Via Fabbrica, 44, Arre (IT) 35020; Alberto Piva, Via Fabbrica, 44, Arre (IT) 35020; Nicola Gallo, Via Viona, 29, Candiana (IT) 35020; Emanuela Gallo, Via Domenico Martinati, 31, Candiana (IT) 35020

( * ) Notice: Subject to any disclaimer, the term of this patent is extended or adjusted under 35 U.S.C. 154(b) by 259 days.

(21) Appl. No.: 11/320,897

(22) Filed: Dec. 29, 2005

(65) Prior Publication Data
US 2007/0151223 A1    Jul. 5, 2007

(51) Int. Cl.
*A01D 45/00* (2006.01)
(52) U.S. Cl. .................................. 56/327.1
(58) Field of Classification Search .............. 56/327.1, 56/330, 331; 210/160, 158
See application file for complete search history.

(56) References Cited

U.S. PATENT DOCUMENTS

| | | | |
|---|---|---|---|
| 3,518,818 A | * | 7/1970 | Porter ..................... 56/327.1 |
| 4,519,191 A | * | 5/1985 | Ledebuhr et al. ............. 56/331 |
| 5,676,829 A | * | 10/1997 | Cotterill ..................... 210/158 |
| 5,846,129 A | | 12/1998 | Dragt |
| 6,820,404 B1 | | 11/2004 | Schwab |

FOREIGN PATENT DOCUMENTS

| GB | 1403361 | 8/1975 |
|---|---|---|
| WO | 9909804 | 3/1999 |

* cited by examiner

Primary Examiner—Árpád Fábián-Kovács
(74) Attorney, Agent, or Firm—IP Stategies

(57) ABSTRACT

A harvesting machine for vegetables includes a bearing structure mounted on rollers and a mowing assembly disposed in the front part of the bearing structure, aligned in a substantially horizontal direction, orthogonal to the advancement direction of the machine. The machine also includes a conveying surface consisting of a number of combs disposed parallel to each other, able to pick up the material cut downstream the mowing assembly and to convey it to an unloading area disposed on the bearing structure. The conveying surface includes at least a belt loop-wound around rotation device. Each of the combs is made of a number of mainly longitudinally developed flexible laminar bodies, transversally disposed with respect to the belt, the laminar bodies having an edge on their length fastened to the belt and the opposite edge provided with a plurality of harvesting teeth.

31 Claims, 4 Drawing Sheets

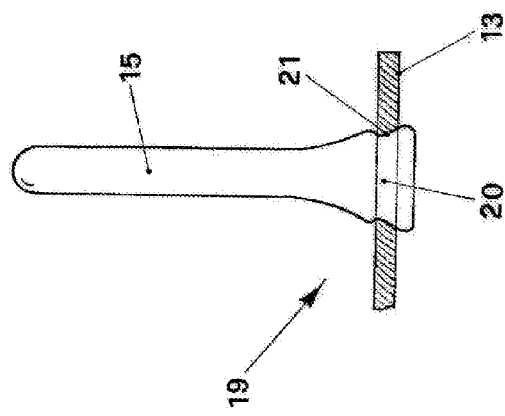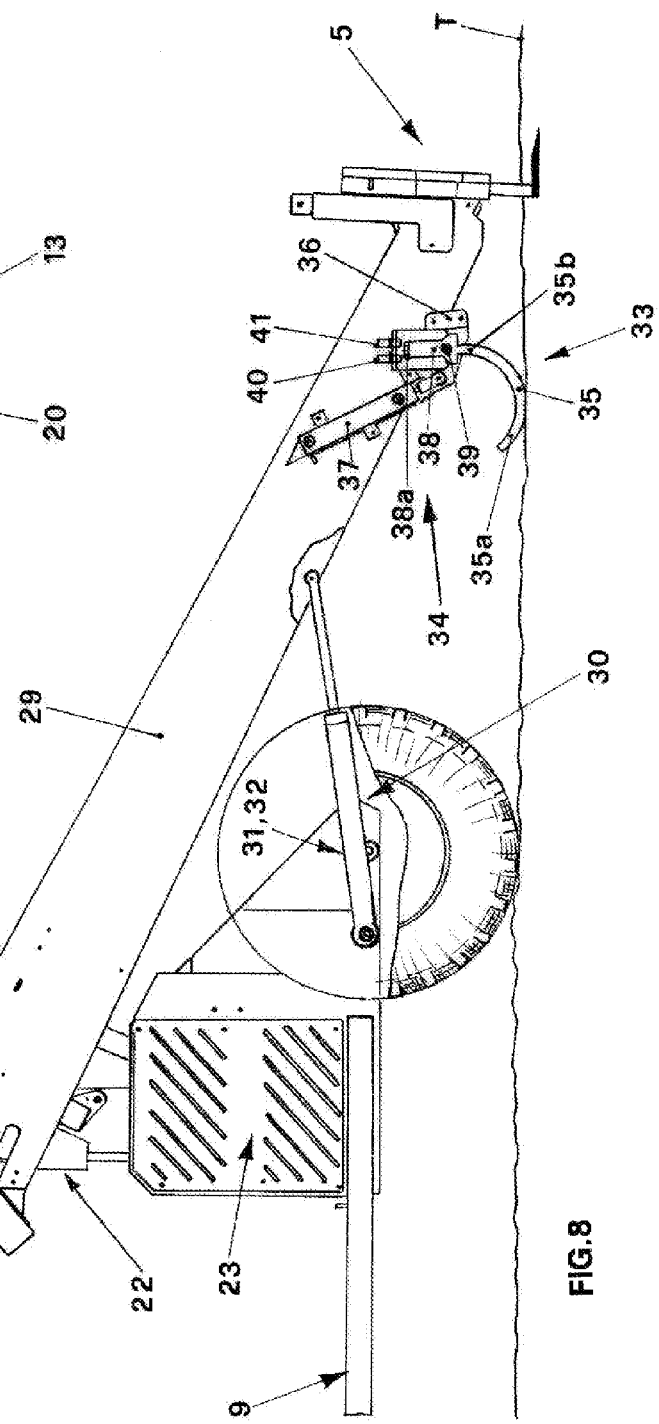

HARVESTING MACHINE FOR TUFT VEGETABLES

BACKGROUND OF THE INVENTION

The present invention is about a harvesting machine suitable in particular to be used for harvesting tuft vegetables.

As it is known, the harvesting of tuft leaf vegetables with small and enveloped leaves, like for example valerian, spinach, Chinese cabbage, lettuce and others, consists of cutting each single plant at the root, below the collar, to maintain the leaves joined together.

The harvested vegetables are then manually disposed inside containers, like for example boxes or bags, in order to be marketed.

Particular harvesting machines, self-propelled and/or towed on the harvesting field by agricultural vehicles, are available on the market for harvesting these and other types of vegetables.

All the harvesting machines belonging to the prior art, although in their different specific executive embodiments, substantially consist of a bearing structure mounted on wheels or moved by agricultural vehicles, provided with a front mowing assembly comprising a mowing blade orthogonally disposed with respect to the advancement direction of the machine.

A conveying surface, loop-wound and connected to mechanisms able to put it in rotation, is present downstream the mowing assembly, said conveying surface consisting of a plurality of combs disposed parallel to each other, able to pick up the vegetables cut downstream the mowing assembly and to convey them to an unloading area located on said bearing structure.

Each comb has the body consisting of a flat and rigid section bar, whose ends are connected to the aforementioned mechanisms of the conveying surface through coupling means of known per se type.

A plurality of substantially L shaped rigid teeth, whose smaller side is connected to the comb body while the greater side protrudes from the body, is coupled with the body of each comb.

The mechanisms comprise a pair of chains, each of them being loop-wound around rolling means supported by the bearing structure of the machine and comprising a guiding plate disposed at the loading area of the conveying surface and toothed wheels engaging with the chains disposed at the unloading area.

Operatively, the mowing blade is brought near to the soil at the cutting point which, according to the type of the vegetable to be harvested, can be above or below the soil level.

The alternate movement of the mowing blade thus performs the cutting operation of the seedlings at the collar, maintaining the leaves joined together as mentioned hereinafter.

Subsequently, the seedlings are picked up through the rigid teeth of each comb of the conveying surface which vertically lifts by rotation said seedlings, placing them in the spaces defined between the teeth and conveying them in the unloading area of the bearing structure.

In this way, the seedlings are conveyed from the loading area, downstream the mowing assembly, to the unloading area, being maintained in a vertical position in order to allow the earth to be detached and to fall downward, thus making easier the work of the operator who picks them up from the conveying surface and puts them in proper containers.

A harvesting machine having the aforementioned characteristics is described in the Italian Patent application no. VI2003A000257, filed by the same applicants of the present application.

However, the known harvesting machines have some acknowledged inconveniences.

A first inconvenience is due to the risk of accident for the operator who picks up the seedlings from the conveying surface when this operation is performed with said surface in motion.

Indeed, the conveying surface consists of a plurality of flat and rigid section bars, generally made of metallic material, mutually spaced and connected to two chains that allow their movement.

As a consequence, when the seedlings placed in each comb have to be picked up, there is the risk for the operator to have his fingers trapped in the free space between a section bar and the subsequent one, and/or to be injured by the rigid teeth.

For these reasons, in the cited known embodiments is preferable to perform the collecting operation of the seedling from the conveying surface by stopping the advancement of said surface, with a consequent productivity decrease of the machine.

Another inconvenience is due to the fact that the mechanisms consisting of the pair of chains coupled with the end of each section bar require a frequent maintenance.

The need to maintain the chains and other mechanical components of the mechanisms which put in motion the conveying surface is made more evident by the hard conditions in which the machine has to operate.

Indeed, in such machines the chains and other transmission components are continuously put in contact with earth, sand and humidity, thus requiring a frequent cleaning and lubrication of the parts forming them.

A further inconvenience, related to the preceding one, is due to the need to replace, with a certain frequency, the chains actuating the combs, because of the strong wear due to the presence of sand and earth they undergo during the harvesting machine normal operation.

Another inconvenience is due to the constructional complexity required to make a conveying surface having the aforementioned characteristics, evidently involving a considerable weight too and consequently the need to properly dimension all the machine parts.

The present invention intends to eliminate the aforementioned inconveniences.

SUMMARY OF THE INVENTION

It is a first object of the invention to provide for a harvesting machine for vegetables in which the vegetables can be picked up from the conveying surface in an easy way and without safety risks for the operator employed on such operation, while the conveying surface is maintained in motion.

It is another object of the invention to provide for a harvesting machine which does not require particular maintenance operations for the conveying surface of the vegetables.

It is a further object of the invention to provide for a harvesting machine which is constructively easier and lighter with respect to the cited prior art.

Said objects are obtained by providing for a harvesting machine for vegetables which, according to the main claim, comprises:

a bearing structure mounted on rolling means;

a mowing assembly disposed in the front part of said bearing structure, aligned in a substantially horizontal direction, orthogonal to the advancement direction of said machine;

a conveying surface consisting of a plurality of combs disposed parallel to each other, able to pick up the material cut downstream said mowing assembly and to convey it to an unloading area disposed on said bearing structure, and wherein said conveying surface comprises at least a belt loop-wound around rotation means, wherein each of said combs is made of a plurality of mainly longitudinally developed flexible laminar bodies, transversally disposed with respect to said belt, said laminar bodies having an edge on their length fastened to said belt and the opposite edge provided with a plurality of harvesting teeth.

Advantageously, the presence of a conveying surface consisting of a loop-wound belt makes safer to directly pick up the seedlings from the belt, preventing the operator's fingers to remain trapped between the combs, as happens in the cited known embodiments.

More advantageously, the presence of the conveying belt loop-wound around rotation means does not require the presence of particularly wearable mechanisms, as happens instead for the chains applied to the cited known embodiments.

Still advantageously, the presence of combs made of laminar bodies provided with flexible teeth makes safer to pick up the seedlings from the conveying surface, preventing that the operator is injured by the comb teeth, as happens in the cited known embodiments in which the teeth coupled with the section bars are rigid and not flexible.

BRIEF DESCRIPTION OF THE DRAWINGS

The aforesaid objects and advantages will be better highlighted in the description of a preferred embodiment of the invention, given in an explanatory and not limiting way, with reference to the figures of the annexed drawings, wherein:

FIG. 7 is a further enlarged detail of FIG. 1; and

FIG. 8 is a side view of the machine of FIG. 1.

DESCRIPTION OF THE INVENTION

Figure 1:
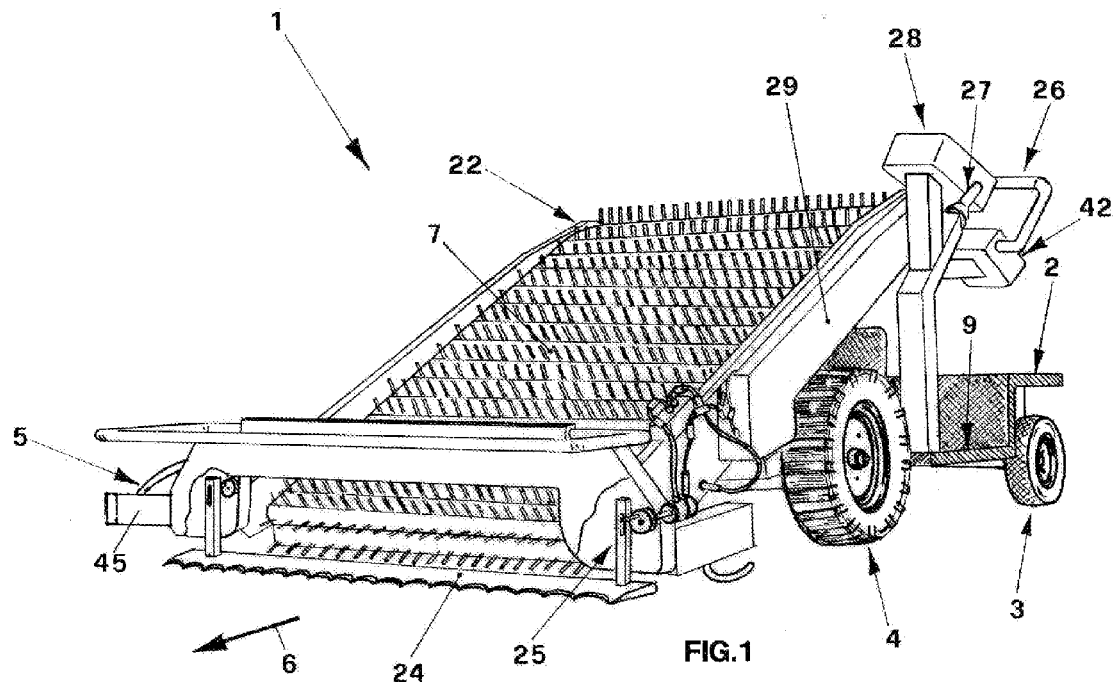
FIG. 1 is an axonometric view of the harvesting machine of the invention.
Figure 2:
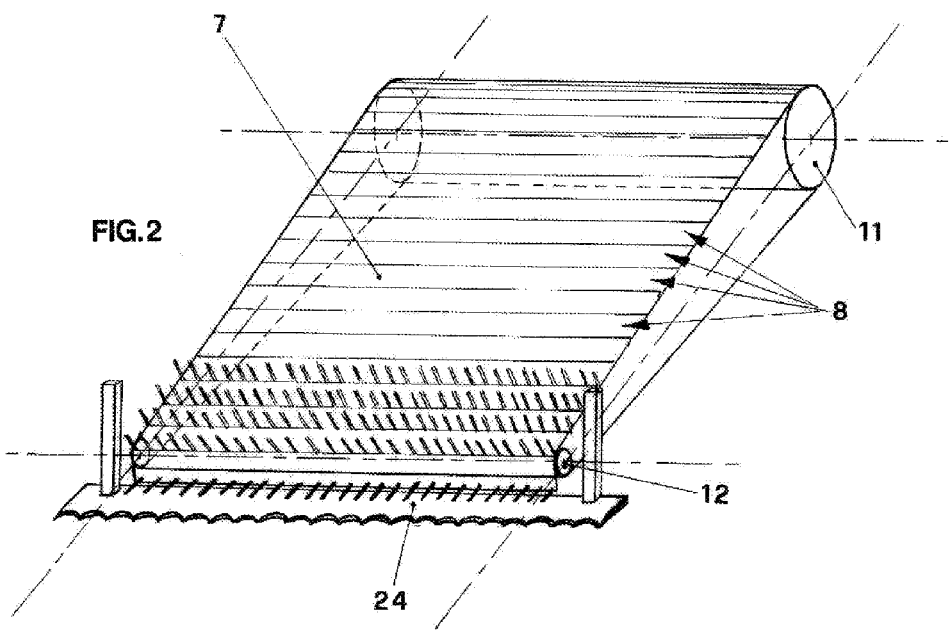
FIG. 2 shows an enlarged detail of the machine of FIG. 1.

As one can see in FIG. 1, the harvesting machine for vegetables of the invention, generally indicated with numeral 1, comprises a bearing structure 2 mounted on rolling means 3, 4, wherein a mowing assembly 5, aligned in a substantially horizontal direction, orthogonal to the advancement direction 6 of the machine 1, is disposed in the front part of said bearing structure.

The harvesting machine 1 is furthermore provided with a conveying surface 7 consisting of a plurality of combs 8 disposed parallel to each other, able to pick up the material P cut downstream the mowing assembly 5 and to convey it to an unloading area 9 disposed on the bearing structure 2.

According to the invention, the conveying surface 7 comprises a belt 10 loop-wound around rotation means 11, 12, wherein each of the combs 8 is made of a plurality of mainly longitudinally developed flexible laminar bodies 13, transversally disposed with respect to the belt 10.

The laminar bodies 13 have on their length an edge 13a transversally fastened to the belt 10 through proper fastening means 14 consisting of heat seals, and the edge 13b, opposite to the edge 13a, provided with a plurality of harvesting teeth 15.

In other executive embodiments, the laminar bodies could be fastened to the belt surface also by stitches, adhesives or with other means of known per se type.

The different flexible laminar bodies 13 are coupled with the surface of the belt 10 in a transverse direction with respect to the advancement direction 16, said bodies being disposed substantially parallel to each other.

Each laminar body 13 could be extended for the entire width of the belt 10 or, alternatively, a number of bodies disposed side by side could be disposed according to the transverse direction of the belt 10.

Figure 3:
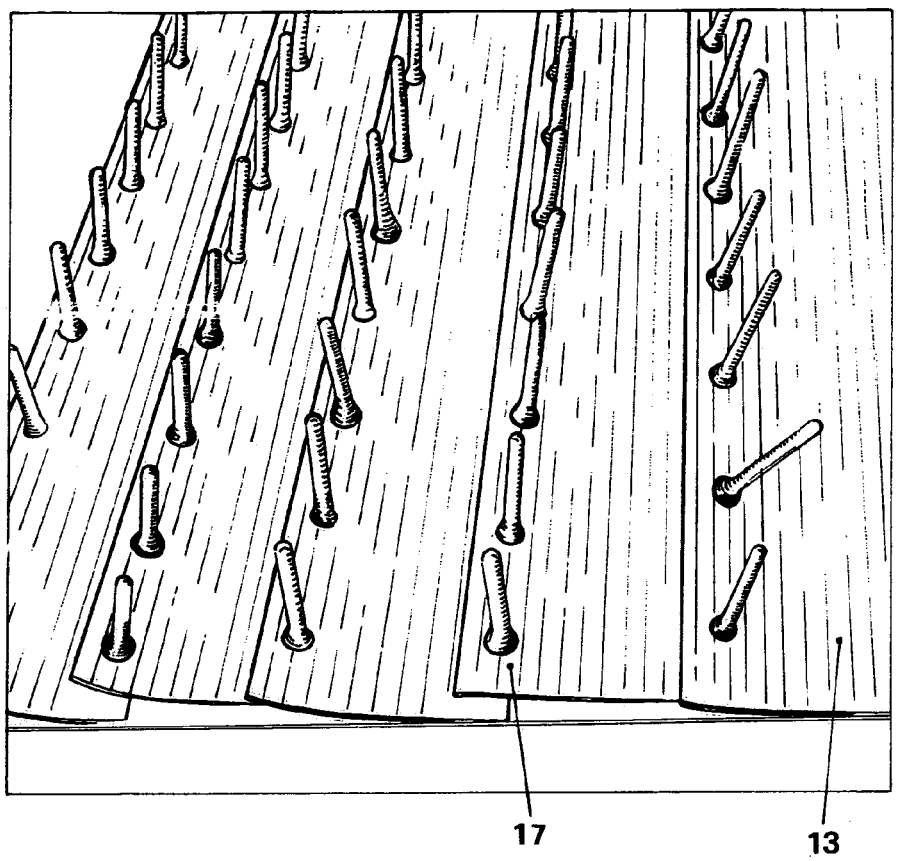
FIG. 3 shows an enlarged detail of FIG. 2.
Figure 4:
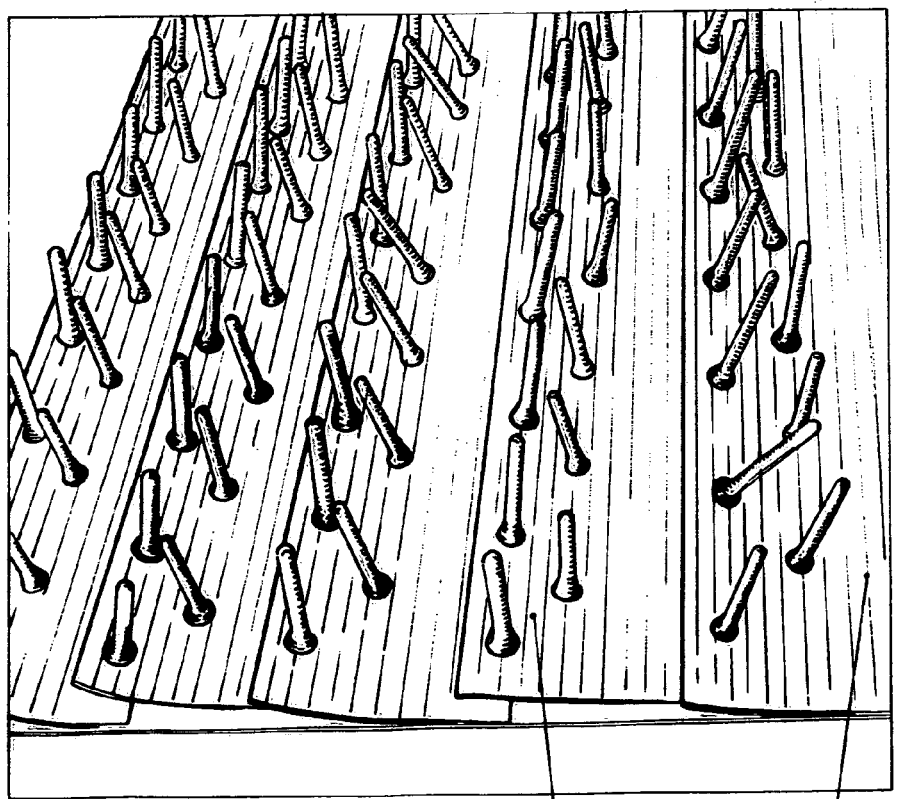
FIG. 4 shows another executive embodiment of the machine of FIG. 1.

Concerning the harvesting teeth 15 coupled with the free edge 13b of each flexible laminar body 13, they are disposed spaced to each other along a single row 17, as shown in FIG. 3, or disposed staggered on more rows 18, as shown in FIG. 4.

Each tooth 15 is coupled with the laminar body 13 through connection means 19, shown in FIG. 7, consisting of shaped profiles 20 able to be snap fitted in a hole 21 obtained on said laminar body 13.

In other executive embodiments, the connection means of each tooth to the laminar body are of screw-nut/screw type and/or other systems known per se. In the executive embodiment shown in the annexed figures of drawings, the harvesting teeth 15 are made of rubber, but they could be made of plastic or metallic material in other embodiments of the machine of the invention, according to the kind of soil and product to be harvested.

Concerning the conveying belt 10, it is loop-wound around the above-mentioned rotation means consisting of a driving drum 11 and a return drum 12, the driving drum 11 being actuated, through mechanical transmission means 22, by the same driving unit 23 which allows the advancement of the harvesting machine 1.

In this way, the advancement of the conveying surface 7 is synchronized with the advancement speed of the machine 1 and, consequently, to the quantity of product P cut by the mowing assembly 5.

In other executive embodiments, the conveying surface could be actuated by an independent motor 45, preferably but not necessarily a hydraulic motor, thus operating independently from the advancement speed of the machine.

The flexible laminar bodies 13, which form the harvesting combs 8 and the belt 10 of the conveying surface 7, are generally made of a cloth covered with a synthetic material or of a mesh, to better drain the water and earth harvested with the vegetables P.

The mowing assembly 5, consisting of a mowing blade 24 coupled with driving means 25 able to give it an alternate movement, is disposed on the front part of the machine.

Alternatively, the mowing assembly could consist of a belt saw whose blade is disposed in a substantially horizontal direction, orthogonal to the advancement direction of the harvesting machine.

In further embodiments, the mowing assembly could consist of a plurality of rotating disc saws of known per se type, actuated by one or more hydraulic or electric motors able to give a continuous rotary or reciprocating movement to each saw disc.

The rotating disc profile could be smooth or provided with cutting teeth. Concerning the rolling means 3, 4 coupled with the bearing structure 2, they consist of tired wheels for the advancement of the machine 1 on the harvesting soil T, wherein the front wheels 4 are coupled, through transmission means, to a driving unit 23 consisting of an internal combustion engine able to make the machine 1 self-propelled, while the rear wheels 3 are able to steer to allow the machine 1 to easily move on the soil T.

In other executive embodiments, the rolling means could also consist of tracks, able to improve the machine grip on the soil, especially in case of rugged and steep lands.

In this case, the possibility to perform bends and/or changes of direction is obtained by varying the speed of one track with respect to the other.

Furthermore, the machine of the invention could be provided without the driving unit, being connected in this case, through proper connection means, to an agricultural vehicle suitable for moving it on the harvesting soil.

The advancement of the machine 1 and the control of the steering wheels 3 are performed through control means 26, for example of joystick 27 type, arranged on a console 28 coupled with the bearing structure 2 of the machine 1.

As one can see in FIG. 8, the bearing structure 2 supports an auxiliary frame 29, overhanging on the front part of the machine 1 with respect to the advancement direction of said machine, indicated by the arrow 6.

The auxiliary frame 29, supporting the aforementioned conveying surface 7 and mowing assembly 5, is joined to the bearing structure 2 of the machine 1 through a driving unit 30, able to move said frame to keep constant the position of the mowing assembly 5 with respect to the material P to be cut according to the morphology of the soil T.

The driving unit 30 comprises actuation means 31, 32, preferably but not necessarily consisting of hydraulic actuators interposed between the bearing structure 2 and the auxiliary frame 29 and feeler means 33 disposed in contact with the soil T to detect its morphology.

The actuation means 31, 32 and the feeler means 33 are mutually connected through a transducer group 34, able to convert the displacement signal detected by the feeler means 33 in contact with the soil T into an electric control signal for the actuation means 31, 32 of the auxiliary frame 29, to which the conveying surface 7 and the mowing assembly 5 are joined.

In this way, the auxiliary frame 29 can be displaced with respect to the bearing structure 2, in order to maintain constant the position of the mowing blade 24 with respect to the product P to be harvested according to the morphology of the soil T.

The variation of the morphology of the soil T is detected through the feeler means 33 disposed on the front part of the auxiliary frame 29, downstream the mowing assembly 5.

However, in other embodiments, the feeler means could also be disposed upstream the mowing assembly, to anticipate the detection of the soil morphology variations and to properly provide for the correction of the mowing assembly position.

As one can see in FIG. 8, the feeler means 33 consist of a bent rod 35, having an end 35a suitable to be put in contact with the soil T, while the opposite end 35b is hinged to a supporting bracket 36 coupled with the auxiliary frame 29 through adjustment means 37 able to change the distance of said feeler means from the frame 29 in order to modify the position of the mowing blade 24 with respect to the product P to be cut.

Each feeler rod 35 is mechanically connected to a detection rod 38, it too hinged on the same axis 39 of the feeler rod 35, whose end 38a is disposed between two photoelectric cells 40, 41.

The displacement of the feeler rod 35, in contact with the soil T during the advancement of the machine 1, causes the detection rod 38 to be displaced and disposed facing the front 41 or the rear 40 photoelectric cell, according to whether the machine 1 runs into a rise or a depression.

When the detection rod end 38a is disposed in front of the photoelectric cell 40, 41, it sends an electric control signal to the driving means of the linear hydraulic actuators 31, 32, which lower or raise the auxiliary frame 29 to adapt the position of the mowing blade 24 to the morphology of the soil T.

The machine 1 of the invention is furthermore provided with control means 42 able to set the response speed of the actuator means 31, 32 of the auxiliary frame 29 to the controls received by the feeler means 33 through each transducer group 34.

For example, said control means 42 allow to delay the response of the actuator means 31, 32 of the auxiliary frame 29 when the soil T is particularly uneven, to avoid the continuous bouncing of the machine 1 during the advancement. Operatively, the mowing blade 24 penetrates in the soil T for a variable depth, according to the product P to be harvested.

The reciprocating motion of the mowing blade 24, as the machine 1 is moving forward, provides for cutting the root of the seedlings P below the soil level, at the collar C of said seedlings, to maintain the leaves joined together.

Subsequently, the seedlings P are harvested through the teeth 15 of each comb 8 of the conveying surface 7, said teeth, by their rotation, vertically lifting the seedling P and allowing it to be positioned in the spaces defined between the combs 8.

Figure 5:
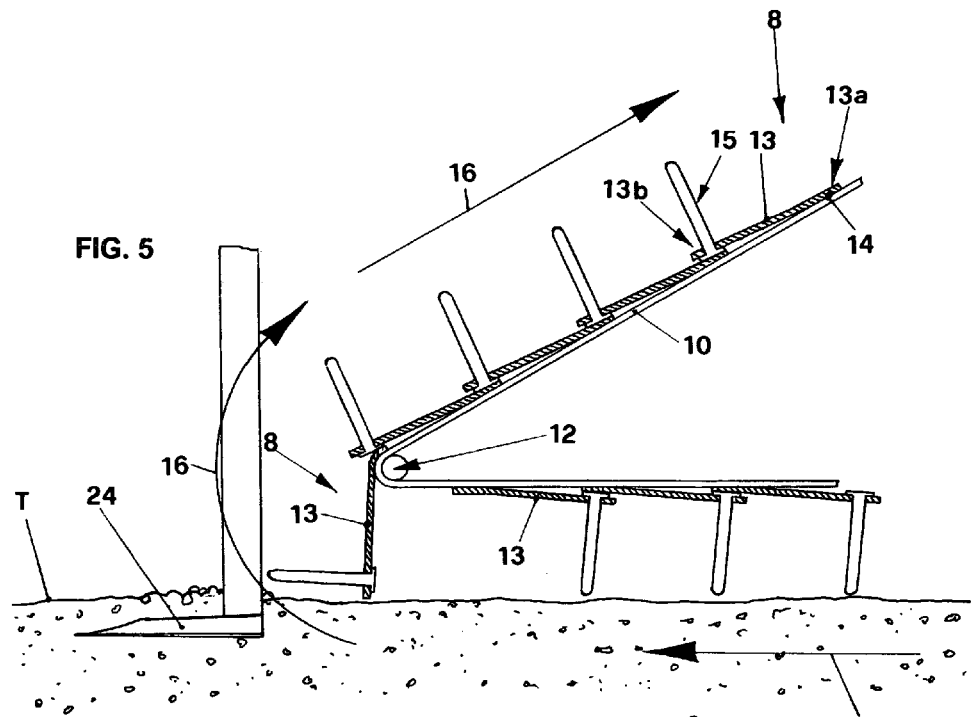
FIG. 5 is a side sectional view of a detail of the machine of FIG. 1.
Figure 6:
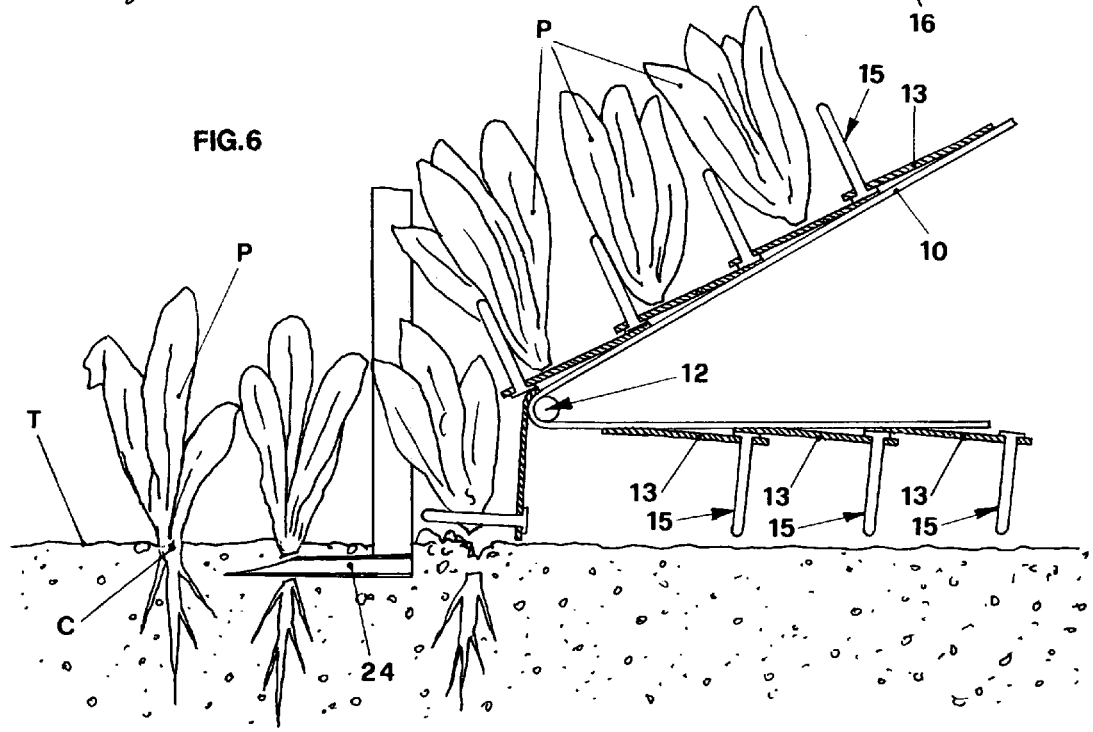
FIG. 6 is a side sectional view of a detail of the machine of FIG. 1 during an operation stage.

The rotation of the conveying belt 10 around the return drum 12 disposed downstream the mowing assembly 5 allows each laminar body 13 to travel along the path, shown in FIGS. 5 and 6, suitable for lifting and harvesting each seedling P.

The lifting motion of the seedlings P performed by the laminar bodies 13 takes place when the belt 10 is at the return drum 12 which has, as one can see in FIG. 5, a smaller diameter with respect to the thickness of the laminar body 13.

Subsequently, the seedlings P are conveyed from the conveying surface 7 to the rear unloading area 9, located on the bearing structure 2 of the machine 1, where the operators pick them up and put them in proper containers.

In particular, near the unloading area 9, the operators manually pick up the seedlings P from the conveying surface 7 in motion.

It is evident that the presence of a continuous conveying surface 7 and flexible harvesting teeth 15 makes easier and safer to pick up the seedlings P.

On the basis of the aforesaid description, it should be understood that the harvesting machine of the invention achieves all the intended objects.

In particular, it is achieved the object to provide for a harvesting machine for vegetables in which the vegetables can be picked up from the conveying surface in an easy way and without safety risks for the operator employed on such operation, while the conveying surface is maintained in motion.

The presence of a continuous conveying belt, provided with combs having flexible teeth, makes safe to manually pick up the vegetables even if the conveying surface is in motion, in accordance with the rules in force regulating the safety in workplaces.

It is achieved the object to provide for a harvesting machine which does not require particular maintenance operations for the conveying surface of the vegetables.

Indeed, it is evident that the conveying belt, due to its intrinsic features, does not require the maintenance interventions typical of the mechanical components described in the cited prior art.

It is achieved the object to provide for a harvesting machine which is constructively easier and lighter with respect to the cited prior art.

Modifications and variations to the harvesting machine of the invention, not described and not shown in the drawings, could be introduced in the executive stage.

All the described and any other not cited embodiments, if they fall within the scope of the protection of the following claims, should be intended as protected by the present patent.

The invention claimed is:

1. A harvesting machine for vegetables, comprising:
   a bearing structure mounted on rolling means;
   a mowing assembly disposed in the front part of said bearing structure, aligned in a substantially horizontal direction, orthogonal to the advancement direction of said machine;
   a conveying surface consisting of a plurality of combs disposed parallel to each other, able to pick up the material cut downstream said mowing assembly and to convey it to an unloading area disposed on said bearing structure,
   wherein said conveying surface comprises at least a belt loop-wound around rotation means, wherein each of said combs is made of a plurality of mainly longitudinally developed flexible laminar bodies, transversally disposed with respect to said belt, said laminar bodies having an edge on their length fastened to said belt and an opposite free edge provided with a plurality of harvesting teeth; and
   wherein said conveying surface is coupled with an auxiliary frame supported by said bearing structure and provided with a driving unit able to move said auxiliary frame to maintain constant the position of said mowing assembly with respect to the material to be cut, according to a morphology of the soil, said driving unit comprising feeler means disposed in contact with the soil able to detect its morphology and actuation means coupled with said bearing structure, mutually connected through a transducer group able to convert the displacement signal detected by said feeler means into an electric control signal for said actuation means.

2. The harvesting machine according to claim 1 wherein said harvesting teeth are disposed spaced to each other along one or more rows at said free edge of each of said laminar bodies.

3. The harvesting machine according to claim 1 wherein said flexible laminar bodies are fastened to the surface of said conveying belt through fastening means.

4. The harvesting machine according to claim 3 wherein said fastening means consist of heat seals.

5. The harvesting machine according to claim 3 wherein said fastening means consist of adhesives.

6. The harvesting machine according to claim 3 wherein said fastening means consist of stitches.

7. The harvesting machine according to claim 1 wherein said harvesting teeth are coupled with said laminar bodies through connection means.

8. The harvesting machine according to claim 7 wherein said connection means consist of shaped profiles able to be snap fitted.

9. The harvesting machine according to claim 1 wherein said flexible laminar bodies comprise a cloth covered with a synthetic material.

10. The harvesting machine according to claim 1 wherein said harvesting teeth are made of a metallic material.

11. The harvesting machine according to claim 1 wherein said harvesting teeth are made of a plastic material.

12. The harvesting machine according to claim 1 wherein said harvesting teeth are made of rubber.

13. The harvesting machine according to claim 1 wherein said rotation means comprise one or more drums.

14. The harvesting machine according to claim 13 wherein at least one of said drums is motorized.

15. The harvesting machine according to claim 1 wherein said rotation means comprise at least a return drum.

16. The harvesting machine according to claim 1 wherein said conveying belt comprises a cloth covered with a synthetic material.

17. The harvesting machine according to claim 1 wherein said conveying belt consists of a mesh.

18. The harvesting machine according to claim 1 wherein said transducer group comprises at least a pair of photoelectric cells electrically connected to driving means of said actuation means which cooperate with a mobile detection rod disposed between said photoelectric cells and mechanically connected to said feeler means.

19. The harvesting machine according to claim 1 wherein said feeler means are connected to said auxiliary frame through adjustment means able
   to change the distance of said feeler means from said auxiliary frame in order to modify the position of said mowing assembly with respect to said product to be cut.

20. The harvesting machine according to claim 1 wherein said mowing assembly comprises a mowing blade provided with driving means able to give it a reciprocating motion.

21. The harvesting machine according to claim 1 wherein said mowing assembly comprises a belt saw actuated by a hydraulic motor.

22. The harvesting machine according to claim 1 wherein said mowing assembly comprises a plurality of rotating disc saws.

23. The harvesting machine according to claim 1 wherein said rolling means consist of tired wheels.

24. The harvesting machine according to claim 1 wherein said rolling means consist of tracks.

25. The harvesting machine according to claim 1 wherein it is provided with a driving unit coupled with said rolling means, able to make said machine self-propelled.

26. The harvesting machine according to claim 1 wherein said conveying belt is actuated by an hydraulic motor.

27. The harvesting machine according to claim 1 wherein it is provided with transmission means able to transmit the motion of said conveying belt to said rolling means to synchronize the winding speed of said belt with the advancement speed of said machine.

28. The harvesting machine according to claim 1 wherein said feeler means are disposed downstream said mowing assembly.

29. The harvesting machine according to claim 1 wherein said driving unit actuates both said rotation means and said rolling means.

30. The harvesting machine according to claim 29 further comprising transmission means through which the driving unit actuates said rotation means and said rolling means.

31. The harvesting machine according to claim 1 wherein said transmission means synchronizes actuation of said rotation means and said rolling means, thereby synchronizing advancement of the conveying surface and advancement speed of the harvesting machine, respectively.

* * * * *